United States Patent
Park et al.

(10) Patent No.: US 9,451,399 B2
(45) Date of Patent: Sep. 20, 2016

(54) METHOD AND APPARATUS FOR POSITION ESTIMATION IN WIRELESS COMMUNICATION

(71) Applicant: LG ELECTRONICS INC., Seoul (KR)

(72) Inventors: Hanjun Park, Seoul (KR); Daesung Hwang, Seoul (KR); Kijun Kim, Seoul (KR); Hyunho Lee, Seoul (KR); Jonghyun Park, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/808,977

(22) Filed: Jul. 24, 2015

(65) Prior Publication Data

US 2016/0029161 A1 Jan. 28, 2016

Related U.S. Application Data

(60) Provisional application No. 62/028,325, filed on Jul. 24, 2014.

(51) Int. Cl.
| | |
|---|---|
| *H04W 24/00* | (2009.01) |
| *H04W 4/02* | (2009.01) |
| *H04L 5/00* | (2006.01) |
| *H04L 27/26* | (2006.01) |
| *H04W 64/00* | (2009.01) |

(52) U.S. Cl.
CPC .............. *H04W 4/02* (2013.01); *H04L 5/0048* (2013.01); *H04L 27/2601* (2013.01); *H04W 64/003* (2013.01)

(58) Field of Classification Search
CPC .............................. H04W 28/18; H04W 88/02
USPC ........ 370/252, 329, 260, 336, 321; 375/224, 375/344, 362, 260, 343; 455/456.1, 67.11, 455/456.2, 114.2; 342/353
See application file for complete search history.

(56) References Cited

U.S. PATENT DOCUMENTS

| | | | |
|---|---|---|---|
| 2010/0266076 A1* | 10/2010 | He ....................... | H04L 27/2676 375/344 |
| 2012/0077516 A1* | 3/2012 | Osinusi ..................... | G01S 5/06 455/456.1 |
| 2013/0176883 A1* | 7/2013 | Han ....................... | G01S 5/0036 370/252 |

\* cited by examiner

*Primary Examiner* — Kiet Doan
(74) *Attorney, Agent, or Firm* — Lee, Hong, Degerman, Kang & Walmey; Jonathan Kang; Michael Monaco

(57) ABSTRACT

A method for receiving a reference signal for positioning in a wireless communication system by a user equipment (UE) is disclosed. The method includes receiving a plurality of reference signal sequences for positioning to which different frequency shift values are applied, calculating a correlation between the plurality of reference signal sequences for positioning and transmitted reference signal sequences for positioning corresponding to the plurality of reference signal sequences in a time domain, and determining a time domain index having a highest value from the correlation as a reference time point for positioning, wherein the frequency shift value is determined according to the sum of multiplication of an index of each reference signal sequence and a frequency shift interval, and frequency offset.

16 Claims, 9 Drawing Sheets

FIG. 7
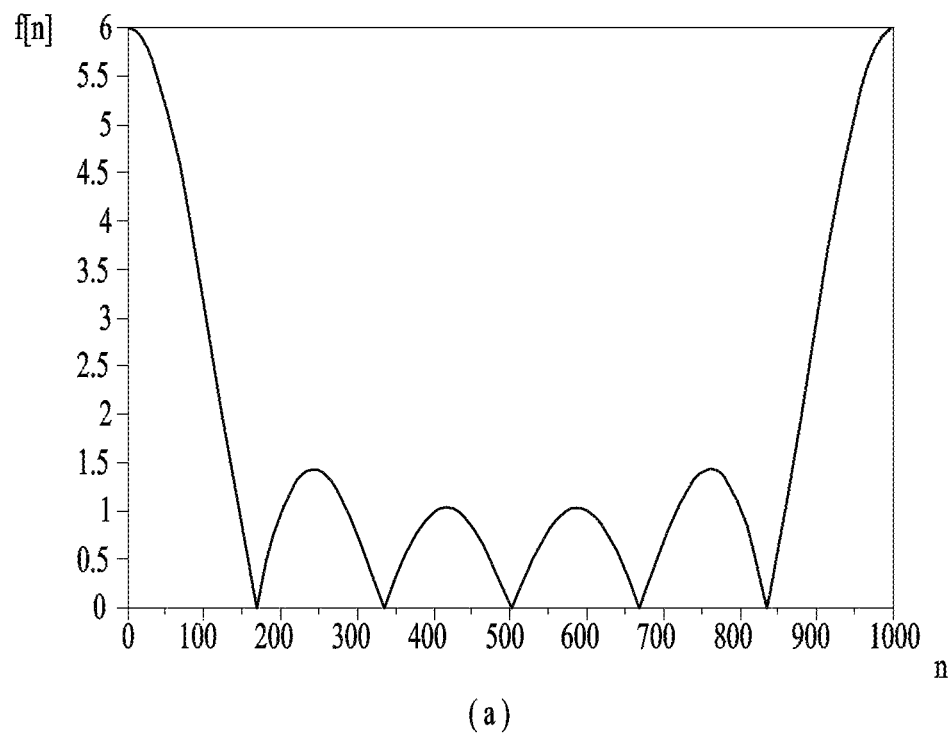
(a)
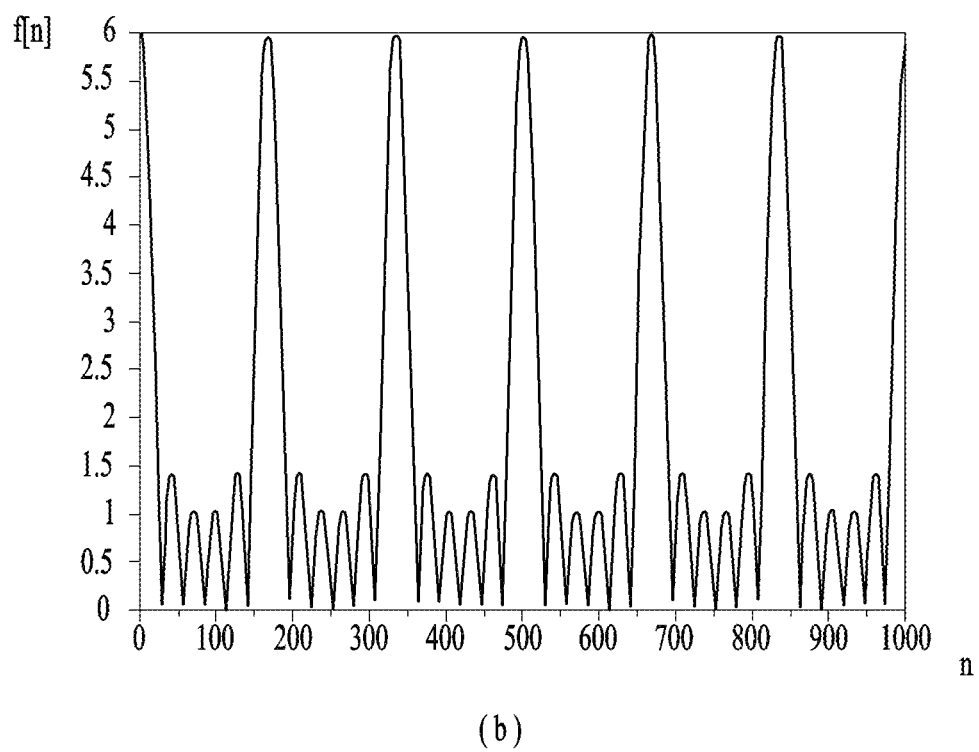
(b)

METHOD AND APPARATUS FOR POSITION ESTIMATION IN WIRELESS COMMUNICATION

Pursuant to 35 U.S.C. §119(e), this application claims the benefit of U.S. Provisional Patent Application No. 62/028,325, filed on Jul. 24, 2014, the contents of which are hereby incorporated by reference herein in its entirety.

BACKGROUND OF THE INVENTION

1. Field of the Invention

The present invention relates to a wireless communication system and, more particularly, to a method for positioning and an apparatus therefor.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for estimating a position substantially obviates one or more problems due to limitations and disadvantages of the related art.

An object of the present invention is to provide a method and apparatus for position estimation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving a reference signal for positioning in a wireless communication system by a user equipment (UE) includes receiving a plurality of reference signal sequences for positioning to which different frequency shift values are applied; calculating a correlation between the plurality of reference signal sequences for positioning and transmitted reference signal sequences for positioning corresponding to the plurality of reference signal sequences in a time domain; and determining a time domain index having a highest value from the calculated correlation as a reference time point for positioning, wherein the frequency shift value is determined according to the sum of multiplication of an index of each reference signal sequence and a frequency shift interval, and frequency offset.

Additionally or alternatively, the frequency shift interval may be determined in such a way that the calculated correlation has only an effective component.

Additionally or alternatively, the frequency shift interval may be determined as N/M, where N may be the number of subcarriers constituting a whole band and M may be the number of the reference signal sequences for positioning.

Additionally or alternatively, the frequency shift interval may be determined as $\lfloor(N-N/M)/D\rfloor$, where N is the number of subcarriers constituting a whole band, M is the number of the reference signal sequences for positioning, and D corresponds to a specific time period.

Additionally or alternatively, the method may further include receiving information about at least one of the number of the reference signal sequences for positioning, an OFDM symbol index of a resource in which the reference signal sequences for positioning are transmitted, the frequency shift interval, or the frequency offset.

Additionally or alternatively, the method may further include receiving information about a candidate set of the number of the reference signal sequences for positioning and a candidate set of the frequency shift interval, or information about a candidate set of combinations of the number of the reference signal sequences for positioning and the frequency shift intervals.

Additionally or alternatively, the method may further include transmitting information about information about preferred number of reference signal sequences for positioning and a preferred frequency shift interval.

Additionally or alternatively, the plurality of reference signals sequences for positioning are transmitted in different OFDM symbols.

In another aspect of the present invention, a user equipment (UE) configured to receiver a reference signal for position estimation in a wireless communication system includes a radio frequency (RF) unit, and a processor configured to control the RF unit, wherein the processor is configured to receive a plurality of reference signal sequences for positioning to which different frequency shift values are applied, to calculate a correlation between the plurality of reference signal sequences for positioning and transmitted reference signal sequences for positioning corresponding to the plurality of reference signal sequences in a time domain, and to determine a time domain index having a highest value from the calculated correlation as a reference time point for positioning; and the frequency shift value is determined according to the sum of multiplication of an index of each reference signal sequence and a frequency shift interval, and frequency offset.

Additionally or alternatively, the frequency shift interval may be determined in such a way that the calculated correlation has only an effective component.

Additionally or alternatively, The frequency shift interval may be determined as N/M, where N is the number of subcarriers constituting a whole band and M is the number of the reference signal sequences for positioning.

Additionally or alternatively, The frequency shift interval may be determined as $\lfloor(N-N/M)/D\rfloor$, where N is the number of subcarriers constituting a whole band, M is the number of the reference signal sequences for positioning, and D corresponds to a specific time period.

Additionally or alternatively, the processor may be configured to receive information about at least one of the number of the reference signal sequences for positioning, an OFDM symbol index of a resource in which the reference signal sequences for positioning are transmitted, the frequency shift interval, or the frequency offset.

Additionally or alternatively, the processor may be configured to receive information about a candidate set of the number of the reference signal sequences for positioning and a candidate set of the frequency shift interval, or information about a candidate set of combinations of the number of the reference signal sequences for position estimation and the frequency shift intervals.

Additionally or alternatively, the processor may be configured to transmit information about information about preferred number of reference signal sequences for positioning and a preferred frequency shift interval.

Additionally or alternatively, the plurality of reference signal sequences for positioning may be transmitted in different OFDM symbols.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a specific term during calculation of a correlation according to an embodiment of the present invention;

DETAILED DESCRIPTION OF THE INVENTION

Figure 1:
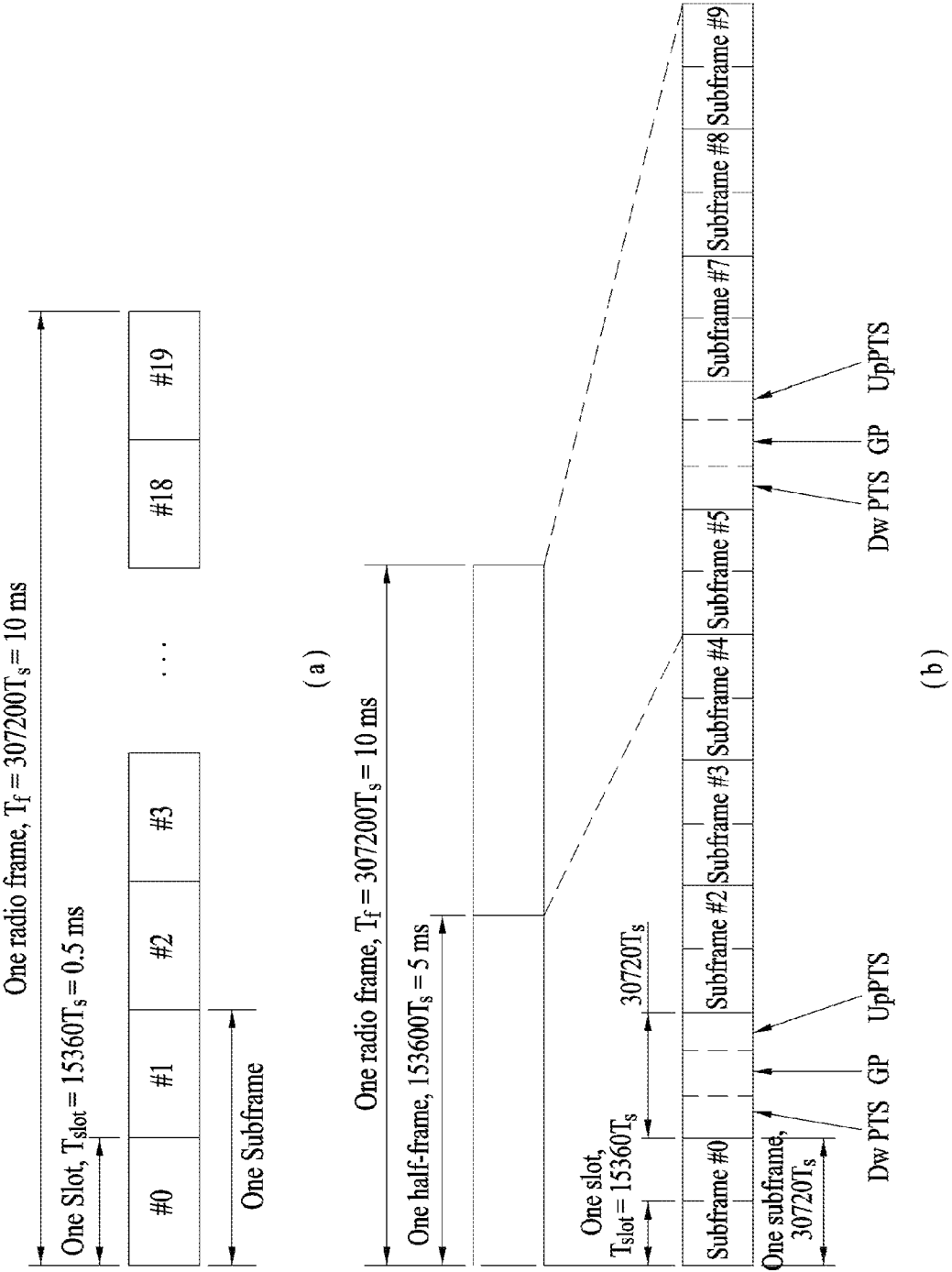
FIG. 1 illustrates an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
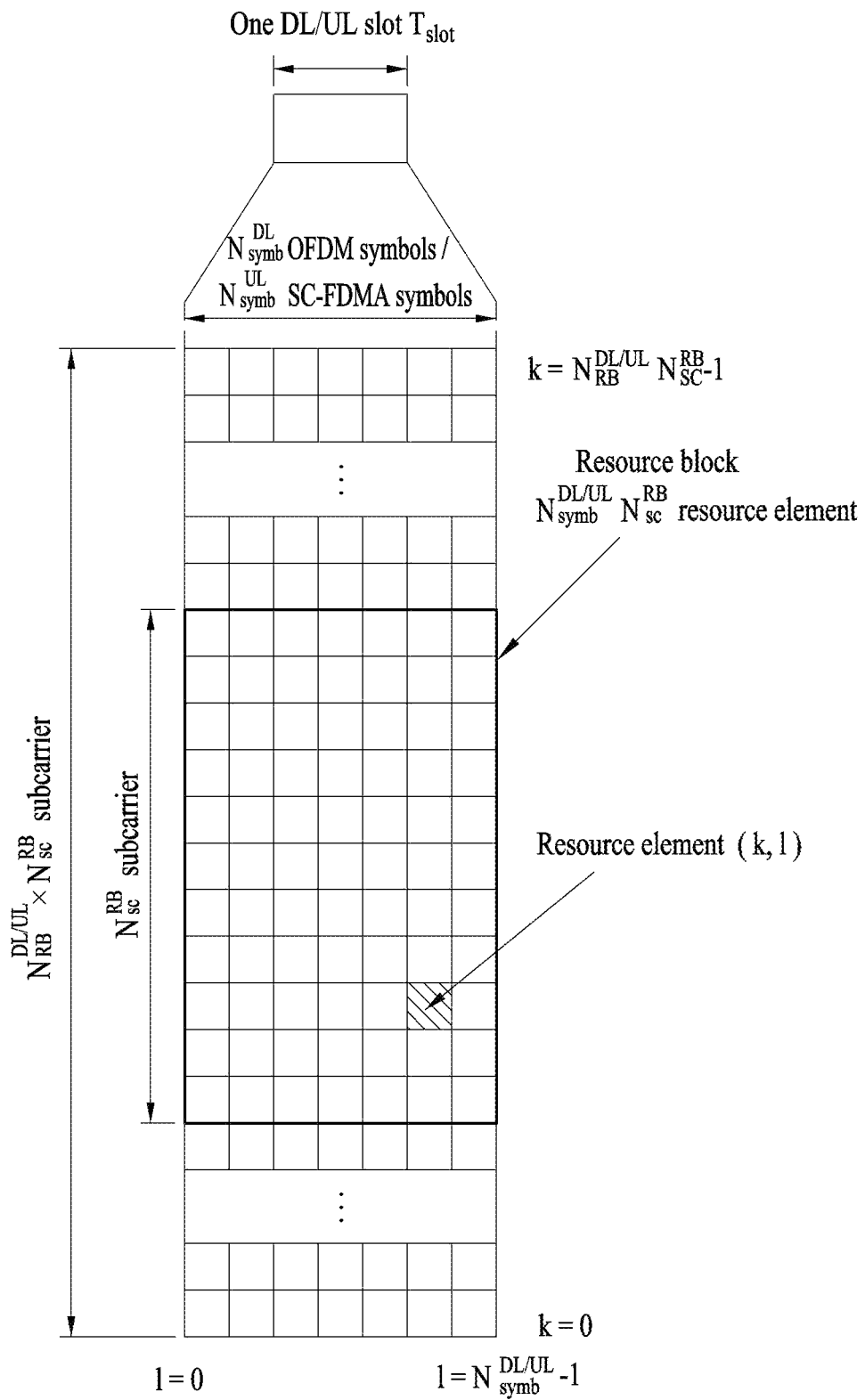
FIG. 2 illustrates an example of downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $B_{symb}^{DL/UL} * N_{sc}^{RB}$ REs. Each RE in a resource grid can be uniquely defined by an

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
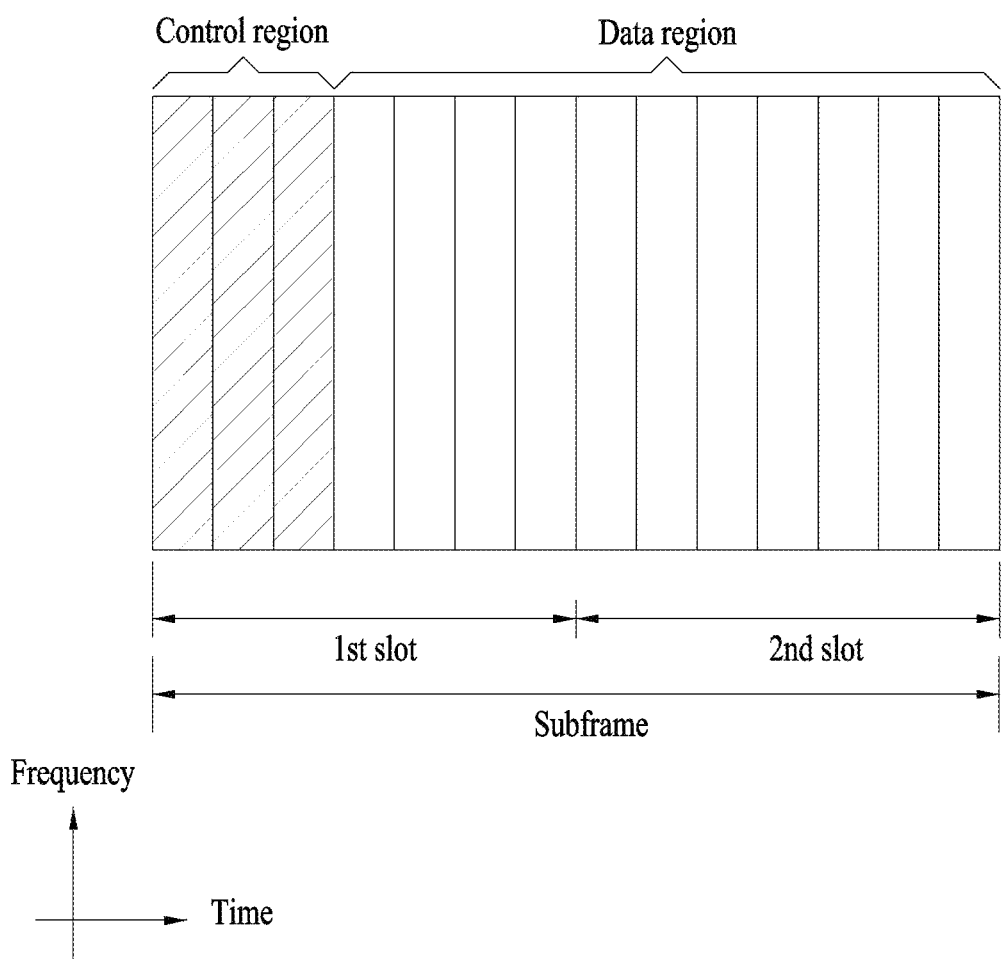
FIG. 3 illustrates an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
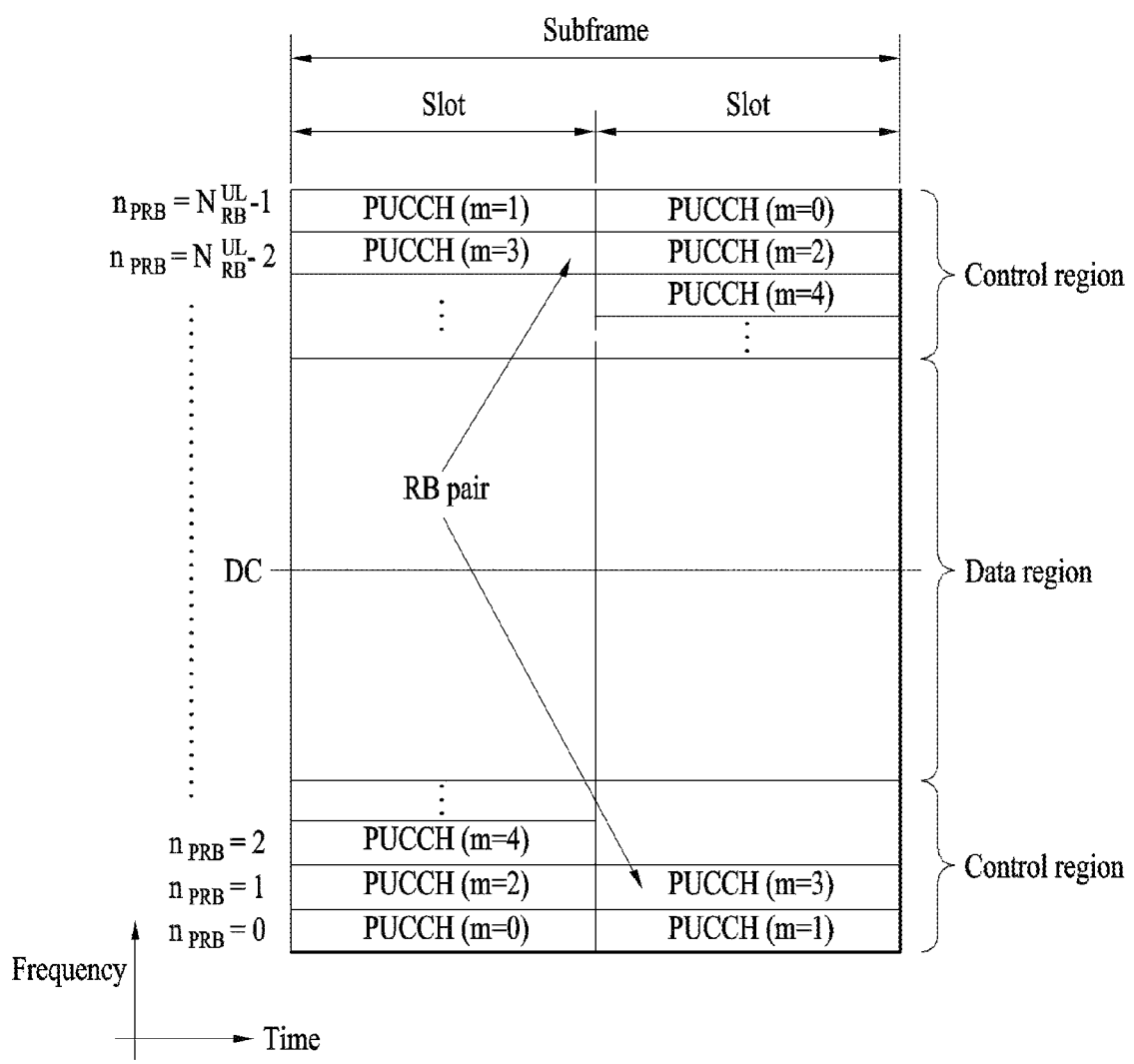
FIG. 4 illustrates an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In general, a cellular communication system has used various methods for acquisition of positional information of a UE by a network. A representative example of the methods may be a positioning method using observed time difference of arrival (OTDOA) in which a UE is configured with positioning reference signal (PRS) transmission associated information of eNBs from a high layer signal, measures PRSs transmitted from cells adjacent to the UE, and transmits a reference signal time difference (RSTD) as a difference between a reception time point of as a PRS transmitted from a reference eNB and a reception time point of a PRS transmitted from a neighbor eNB to an eNB and a network, and the network calculates a position of the UE using RSTD and other information items, in a 3GPP LTE(-A) system. In addition, there are other methods such as an assisted global navigation satellite system (A-GNSS) positioning scheme, an enhanced cell-ID (E-CID) scheme, and uplink time difference of arrival (UTDOA), and it may be possible to use the positioning method in various position-based services (e.g., advertisement, position tracking, emergency communication means, etc.).

An enhanced wireless communication system, such as 3GPP LTE Rel-12 has considered a positioning scheme for accurately recognizing positional information of UEs in an indoor environment, etc. with a large amount of non-line of sight (NLOS) components. In LTE Rel-9, an example of the scheme may include an observed time difference of arrival (OTDOA) scheme in which cells (e.g., evolved Node B or transmission point) transmit a positioning reference signal (PRS) and a UE estimates TDOA from the PRS and transmits the estimated TDOA to a network. However, conventional schemes such as the OTDOA scheme have a problem in terms of low accuracy in the NLOS environment, and thus a positioning scheme for enhancing accuracy even in the NLOS environment has been considered.

The reason for degrading the accuracy of TDOA in a channel with the NLOS component, i.e., a muliti-path fading channel will be described below. For example, when an adjacent cell transmits a known signal x[n] such as PRS, the corresponding signal is received through a channel h[n], and in this case, a UE that wants to estimate TDOA may calculates a correlation according to the following Equation.

$$C = \sum_{n=0}^{N-1} y[n]x[n]^* = \sum_{k=0}^{N-1} Y[k]X[k]^* = \sum_{k=0}^{N-1} H[k]X[k]X[k]^*$$ [Equation 1]

$$= \sum_{n=0}^{N-1} h[n] \cdot (x[n]^* \circ x[-n])$$

Here, n refers to a time axis index of discrete time domain, ○ refers to circular convolution, and X[k], Y[k], and H[k] refer to DFT transformation of x[n], y[n], and h[n], respectively. An example of X[k] is defined as follows.

$$X[k] = \sum_{n=0}^{N-1} x[n]e^{-j\frac{2\pi kn}{N}}$$ [Equation 2]

In this case, assuming that the channel h[n] can be represented using a tapped delay line (TDL) model, the h[n] may be presented as follows.

$$h[n] = \sum_{l=0}^{L-1} \alpha_l \delta[n - d_l]$$ [Equation 3]

Here, $\alpha_l$ refers to a complex channel gain, $d_l$ refers to delay of an $l^{th}$ path, and L refers to the number of channel paths. Next, assuming that $u[n]=x[n]^* \circ x[-n]$, Equation 1 above may be represented using Equation 3 above.

$$C = \sum_{n=0}^{N-1} \left( \sum_{l=0}^{L-1} \alpha_l u[n]\delta[(n - d_l) \bmod N] \right) =$$ [Equation 4]

$$\sum_{l=0}^{L-1} \alpha_l \left( \sum_{n=0}^{N-1} u[n]\delta[(n - d_l) \bmod N] \right)$$

In this case, it is assumed that two paths are present in a channel, a first path is a LOS path and a second path is a NLOS path with a phase that reversely varies due to reflection. In more detail, for example, it may be assumed that L=2, $\alpha_0$=1, and $\alpha_1$=−0.5. It is assumed that a fast Fourier transform (FFT) period is set according to a time point when a signal is transmitted along the first channel path. Then $d_0$=0, 0<$d_1$=d≤N−1, and thus Equation 4 above may be represented as follows.

$$C = \alpha_0 u[0] + \alpha_1 u[d]$$ [Equation 5]

In this case, when x[n] corresponding to an RS is transmitted in a sub-band corresponding to 1/K of a whole band including N subcarriers in consideration of RS transmission overhead, u[n] may have resolution of a maximum of K in discrete time domain. Here, when u[n] has resolution of K, this means u[Kn]=0, n≠0. For example, when RS x[n] is a constant amplitude zero autocorrelation (CAZAC) sequence such as Zadoff-Chu sequence, u[n] has resolution of K. In this case, assuming that d<<K, u[0]≅u[d]=κ may be expected, and in Equation 5 above, a correlation value may have C≅0.5·κ since a component for the first path and a component for the second path are offset. On the other hand, assuming that a FFT period is set according to a time point when a signal according to the second channel path is transmitted, $d_1$=0 and $d_0$=−d<0, and thus Equation 4 may be represented as follows.

$$C = \alpha_0 u[N-d] + \alpha_1 u[0]$$ [Equation 6]

Here, u[N−d] is equal to u[d]* according to conjugate symmetry characteristics of u[n]. In this case, C≅0.5·κ is still satisfied. Accordingly, when TDOA or the like is estimated based on amplitude of correlation, ambiguity may occur in terms of an appropriate time point from a time point selected based on time delay of the first channel path and a time point selected based on time delay of the second channel path.

Accordingly, the present invention proposes a method for enhancing TDOA performance by combining channels represented by a TDL model with respect to M RSs in an FFT period set to measure a correlation for TDOA estimation by a UE in the form of a channel that virtually has a single channel tap via a frequency shift diversity (F SD) operation for repeatedly transmitting RSs with the same sequence N times, applying different frequency shifts (FSs) to the respective RSs, and transmitting the RSs in an OFDM based wireless communication system having a path fading channel environment in which a LOS path and a NLOS path coexist.

FSD with Respect to M RS Signals

According to an embodiment of the present invention, a method for deriving $y_m[n]$ by applying FS corresponding to $k_m$ to an $m^{th}$ RS signal x[n] in a transmitter and applying FS corresponding to $-k_m$ to a signal received through a channel in a receiver when RS signal x[n] is repeatedly transmitted M times will be described below. First, when FS corresponding to $k_m$ is applied to the RS signal $x[n]$, the RS signal $x[n]$ may be represented as $X[k+k_m]$ in the frequency axis and represented using phase shift in the time axis according to the following Equation.

$$x_m[n] = x[n]e^{j\frac{2\pi k_m n}{N}},$$
$$n = 0, 1, \ldots, N-1$$

[Equation 7]

Next, when a signal received through a channel $h[n]$ is $\tilde{y}_m[n]$, $y_m[n]$ may be derived by applying FS corresponding to $-k_m$ to a signal received from the receiver to acquire $\tilde{Y}_m[k-k_m]$ in the frequency axis. In this case, according to the following Equation, $y_m[n]$ is represented as a signal transmitted through a virtual channel $\tilde{h}_m[n]$ in which the RS signal $x[n]$ is represented as $H[k-k_m]$ in the frequency axis.

$$y_m[n] = e^{-j\frac{2\pi k_m n}{N}} \tilde{y}_m[n] \quad n = 0, 1, \ldots, N-1$$

[Equation 8]

$$= e^{-j\frac{2\pi k_m n}{N}} (\tilde{x}_m[n] \circ h[n])$$

$$= e^{-j\frac{2\pi k_m n}{N}} \sum_{m=0}^{N-1} \tilde{x}[m] h[(n-m) \bmod N]$$

$$= e^{-j\frac{2\pi k_m n}{N}} \sum_{m=0}^{N-1} x[m] e^{j\frac{2\pi k_m n}{N}} h[(n-m) \bmod N]$$

$$= \sum_{m=0}^{N-1} x[m] e^{j\frac{2\pi k_m ((n-m) \bmod N)}{N}} h[(n-m) \bmod N]$$

$$= x[n] \circ \tilde{h}_m[n]$$

Here, $\circ$ refers to circular convolution, and $\tilde{h}_m[n]$ refers to a virtual channel to which linear phase increment components are reflected to the channel $h[n]$ and is represented according to the following Equation.

$$\tilde{h}_m[n] = h[n] e^{j\frac{2\pi k_m n}{N}}$$

[Equation 9]

Figure 5:
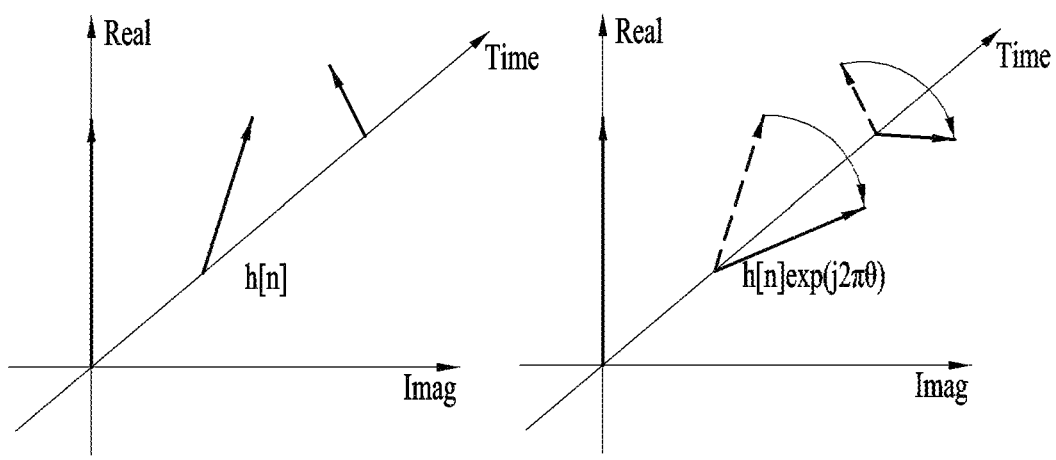
FIG. 5 is a relation between an actual channel and a virtual channel.

In this case, a relation between a channel $h[n]$ and a virtual channel $\tilde{h}_m[n]$ is shown in FIG. 5.

Correlation Sum and Standard for TDOA Estimation

An embodiment of the present invention proposes a method of deriving a correlation $C_m$ between an $m^{th}$ RS signal $x[n]$ and a received signal $y_m[n]$ and summing $C_m$ with respect to M RSs to derive a final correlation C, and determining an amplitude of C as a standard for TDOA estimation. First, a correlation between $y_m[n]$ and $x[n]$ may be obtained according to the following Equation similarly to Equation 1.

$$C_m = \sum_{n=0}^{N-1} \tilde{h}_m[n] \cdot (x[n]^* \circ x[-n])$$

[Equation 10]

In this case, a final correlation C may be calculated by summing $C_m$ with respect to M RSs as follows.

$$C = \sum_{m=0}^{M-1} C_m$$

[Equation 11]

-continued $$= \sum_{m=0}^{M-1} \sum_{n=0}^{N-1} \tilde{h}_m[n] \cdot (x[n]^* \circ x[-n])$$

$$= \sum_{n=0}^{N-1} \left( \sum_{m=0}^{M-1} \tilde{h}_m[n] \right) \cdot (x[n]^* \circ x[-n])$$

$$= \sum_{n=0}^{N-1} \left( \sum_{m=0}^{M-1} h[n] e^{j\frac{2\pi k_m n}{N}} \right) \cdot (x[n]^* \circ x[-n])$$

In this case, it may be expected that $\tilde{h}_m[n]$ with respect to M RSs is summed to offset the remaining channel taps except for an adjacent channel tap of $n=0$ so as to relieve amplitude of the signals. That is, as a channel is close to $n=0$, offset is less achieved, and a channel is far from $n=0$, offset is more achieved. Accordingly, a channel obtained by summing $\tilde{h}_m[n]$ with respect to M RSs may be close to a channel that virtually has a signal channel tap. That is, the UE may obtain a correlation in consideration of only the adjacent channel tap of $n=0$ in an FFT period set by the UE and select a time point with a highest value based on an absolute value of the final correlation C of Equation 11 to perform TDOA estimation.

Setting Method of FSD Value

An embodiment of the present invention proposes a method for setting a repetitive transmission number of times M of an RS to satisfy M≤K and setting FS with respect to $m^{th}$ RS signal $x[n]$ to satisfy $k_m = m \cdot P + k_o$ with regard to an equivalent interval P and frequency offset $k_o$ when RS $x[n]$ is transmitted in a sub-band corresponding to 1/K of a whole band including N subcarriers in consideration of RS transmission overhead. Equation 11 above may be summarized according to the following Equation.

$$C = \sum_{n=0}^{N-1} h[n] \cdot \left( \sum_{m=0}^{M-1} e^{j\frac{2\pi k_m n}{N}} \right) \cdot u[n]$$

[Equation 12]

$$= \sum_{n=0}^{N-1} h[n] \cdot f[n] \cdot u[n]$$

In this case, $f[n]$ functions as a filter in a discrete time domain, has M limited filter taps in the frequency axis, and is represented as having a filter coefficient of 1 in each tap. In this case, assuming that $x[n]$ is designed using a CAZAC sequence such as Zadoff-Chu sequence, $u[Kn]=0$, $n \neq 0$ is satisfied, and thus components in $h[Kn]=0$, $n \neq 0$ may be inevitably removed from a process for calculation of a correlation. Hereinafter, a method for designing $f[n]$ for removing other channel components will be proposed. Hereinafter, the case of $k_o=0$ is assumed for convenience of description of an operation, but when $k_o$ is not 0, only phase shift for multiplication of $f[n]$ by $\exp(-j2\pi k_o n/N)$ is given.

A. In the Case of P=N/M

According to an embodiment of the present invention, a method for setting FS with respect to $m^{th}$ RS signal $x[n]$ as $k_m = m \cdot N/M + k_o$ will be described. For example, when $k_o=0$ and a FS value with respect to the $m^{th}$ RS signal $x[n]$, that is, $k_m = m \cdot N/M$ are designed, $f[n]$ may be represented according to the following Equation.

$$f[n] = \sum_{m=0}^{M-1} e^{j\frac{2\pi (m \cdot N/M) n}{N}}$$

[Equation 13]

$$= \sum_{m=0}^{N/M-1} M \cdot \delta[n - m \cdot M]$$

Figure 6:
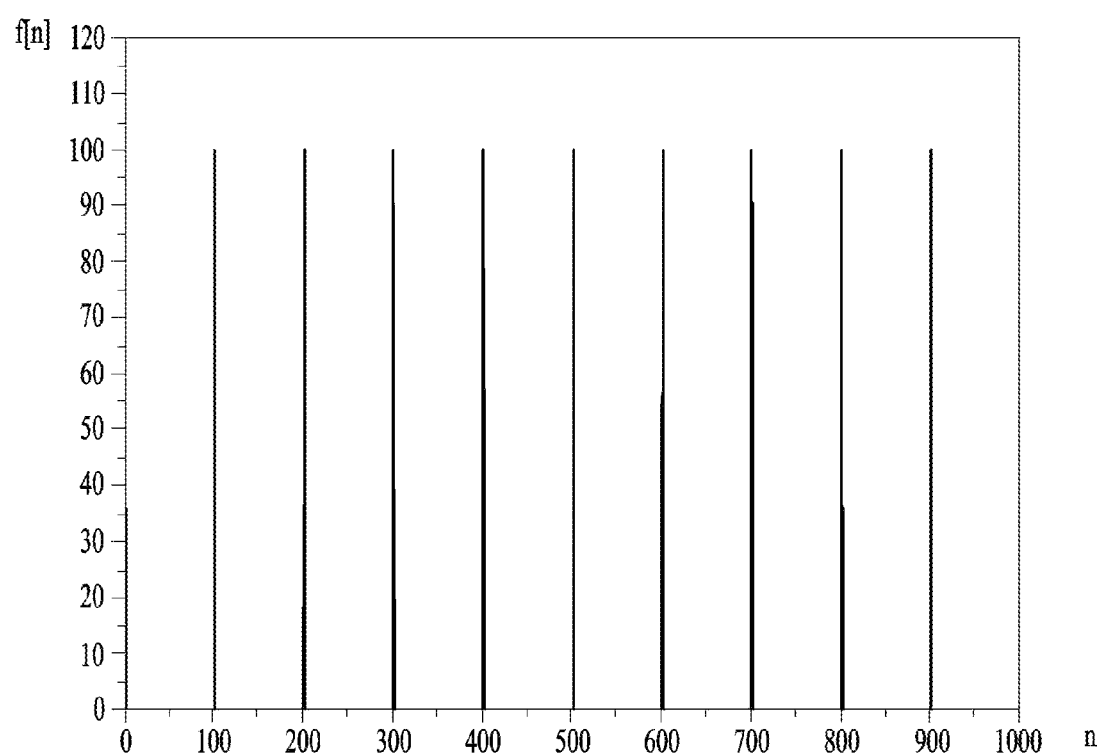
FIG. 6 illustrates a specific term during calculation of a correlation according to an embodiment of the present invention.

Accordingly, f[n] satisfies f[n]=0 at any time point except for M·n, n=0, 1, 2, ..., N/M−1, and thus a channel component at the corresponding time point may be removed from a correlation calculation process. When M=K, only a first tap of a channel, that is, a h[0] component is reflected to the correlation calculation process to overcome errors of TDOA estimation using a multi-path according to a condition of u[Kn]=0, n≠0 and a condition that f[n] satisfies f[n]=0 at any time point except for K·n, n=0, 1, 2, ..., N/K−1. In this case, M may have a smaller value than K so as to remove almost channel tap components while reducing transmission load, thereby enhancing efficiency. For example, when N=1000, M=100, and $k_m$=m·100, f[n] is represented in FIG. 6.

B. In the Xase of P<N/M

According to an embodiment of the present invention, a method for setting P=⌊(N−N/M)/D⌋ and designing FS with respect to $m^{th}$ RS signal x[n] according to $k_m$=m·P+$k_o$ when a transmitter recognizes a period D in which a channel tap component that provides interference to TDOA estimation as average channel information is present and a repetitive transmission number of times M of an RS signal satisfies M≤K will be described. In the aforementioned case of P=N/M, when M is not sufficiently large, it is disadvantageous that channel taps are reflected to the correlation calculation process with a high frequency (i.e., 1/M). Assuming P=1 with respect to given M, f[n] is given using a sinc function as follows.

$$f[n] = \frac{\sin(\pi n M/N)}{\sin(\pi n/N)} \qquad \text{[Equation 14]}$$

Although fluctuation is present in the sinc function, the sinc function may be used as one type of a low-pass filter. Equation 14 above may be considered by applying zero-padding in a frequency axis with respect to an equivalent FS given as P and may be represented according to the following Equation.

$$f[n] = \frac{\sin(\pi(n \bmod N/P)MP/N)}{\sin(\pi(n \bmod N/P)P/N)} \qquad \text{[Equation 15]}$$

For example, FIG. 7 illustrates f[n] of the case of M=6 and 0 P=1 (FIG. 7(a)) and the case of M=6 and P=6 (FIG. 7(b)).

D needs to be smaller than a length before a main lobe of a secondarily repeated sinc function in Equation 15 is begun. That is, D may be represented according to the following Equation.

$$D \le \frac{N}{P} - \frac{N}{MP} \Rightarrow P \le (N - N/M)/D \qquad \text{[Equation 16]}$$

In addition, within the range that satisfies Equation 16 above, as P is increased, amplitude of a pass band is reduced from a low-pass filter point of view, and as a result, P may be set according to the following Equation.

$$P = \lfloor (N - N/M)/D \rfloor \qquad \text{[Equation 17]}$$

For example, f[n] according to the example of FIG. 7 causes power reduction of −3 dB or less with respect to taps of h[n] generated in about 10 front sample times or more. In order to reduce amplitude of a pass band of the low-pass filter, a period D in which a transmitter increases M or assumes presence of a channel component that can impede TDOA estimation needs to be set to be small.

In order to support the operation of the aforementioned embodiment, the transmitter or the network needs to notify the receiver of a repetitive transmission number of times M of the RS signal, information about an OFDM symbol index of a transmitted resource, information of P as an equivalent FS interval between RS signals, and frequency offset $k_o$ applied to all RS signals via a high layer signal or the like.

Feedback of Receiver

As described above, in order to apply FS to offset the remaining channel components except for an effective tap component of a channel, a transmitter needs to previously recognize channel information. However, in general, the accuracy of channel information estimated by a receiver is high, and thus a method in which the receiver calculates and feeds back M and P to the transmitter such that f[n] in Equation 12 above leaves only front tap components of channel h[n] can be considered. In this case, the receiver may be previously configured with a set $S_M$ of values as repetitive transmission number of times M of the RS and a set $S_P$ of values as an equivalent FS interval P between RSs from an eNB or a network. Alternatively, the receiver may be previously configured with a set $S_{M,P}$ of values as a combination (M, P) from the eNB or the network and may feedback one set. Alternatively, the receiver may feedback only an appropriate P with respect to a preset M. Alternatively, the receiver may feedback information about the period D in which an effective channel tap is present directly to the transmitter.

Transmission in a Plurality of OFDM Symbols

According to an embodiment of the present invention, when RS signal x[n] is repeatedly transmitted M times, if a transmitter applies FS corresponding to $k_m$ to $m^{th}$ RS signal x[n] and a receiver applies FS corresponding to −$k_m$ to a signal received through a channel to derive $y_m$[n], the RS signal x[n] may be transmitted in M different OFDM symbols. For example, as described above, when $k_m$ is greater than a transmission bandwidth of RS signal x[n], RS signals need to be transmitted in different OFDM symbols so as not to overlap. Accordingly, an embodiment of the present invention proposes a method for applying the RS signal x[n] to different FSs $k_m$ in M different OFDM symbols and transmitting the RS signal x[n].

According to the operation of the present invention, when RS signals are repeatedly transmitted in a sub-band and FDS for transmitting different FS in transmission of the respective RSs is applied, an equivalent effect of transmitting an RS signal in a wideband can be achieved, and it is advantageous that a CAZAC sequence or the like is introduced with respect to an RS transmitted in a sub-band, selectivity of which is not relatively high, so as to differentiate RSs transmitted from different transmitters using cyclic shift (CS) in the same frequency resource.

Figure 8:
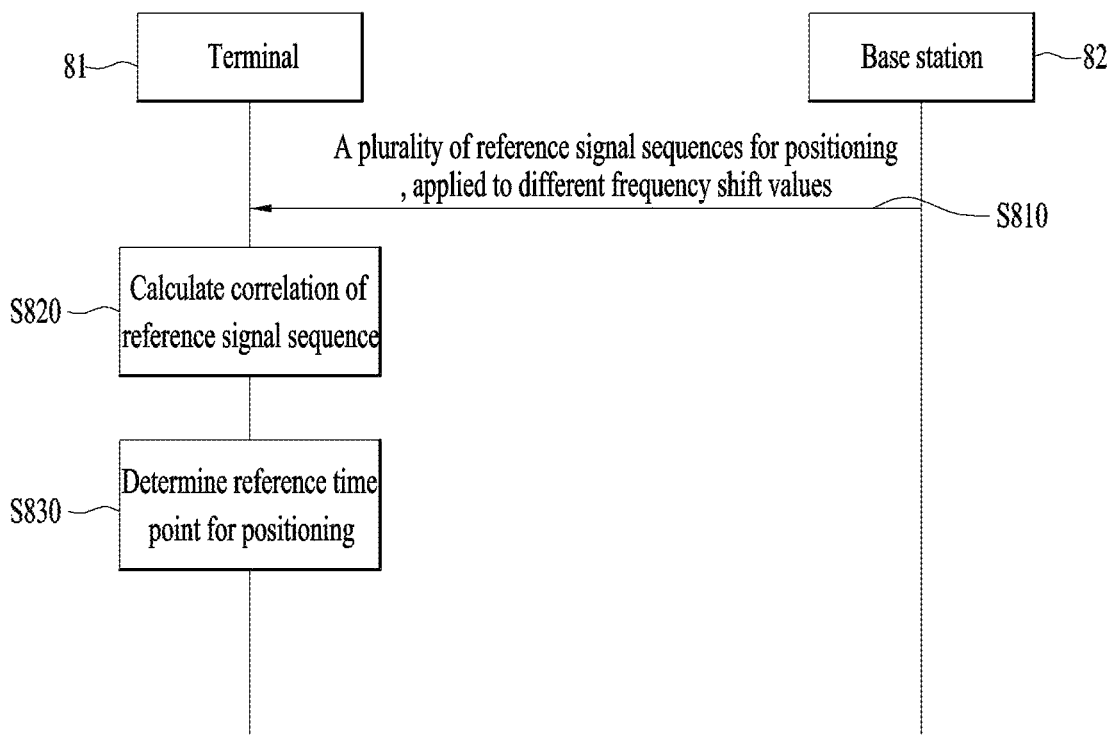
FIG. 8 illustrates an operation according to an embodiment of the present invention.

FIG. 8 is a diagram illustrating an operation of a UE 81 and a BS 82 according to an embodiment of the present invention.

The UE 81 may receive a plurality of reference signal sequences for position estimation from the BS 82 (S810). The plurality of reference signal sequences for position estimation, to which different frequency shift values are applied, may be transmitted. In addition, the plurality of reference signal sequences for position estimation may be transmitted in different OFDM symbols.

The UE 81 may calculate a correlation between the plurality of reference signal sequences for position estimation and reference signal sequences transmitted in response thereto in the time domain (S820). The UE 81 may determine a time domain index with a highest value from the calculated correlation as a reference time point for position estimation (S830).

The frequency shift value applied to the plurality of reference signal sequences for position estimation may be determined according to the sum of multiplication of an index of each reference signal sequence and a frequency shift interval, and frequency offset. In addition, the frequency shift interval may be determined such that the calculated correlation has only effective components.

The frequency shift interval may be determined as N/M. Here, N may be the number of subcarriers constituting a whole band and M may be the number of reference signal sequences for position estimation.

The frequency shift interval may be determined as $\lfloor(N-N/M)/D\rfloor$. Here, N may be the number of subcarriers constituting a whole band, M may be the number of reference signal sequences for position estimation, and D may correspond to a specific time period.

In addition, the UE may receive information about at least one of the number of the reference signal sequences for position estimation, an OFDM symbol index of a resource in which the reference signal sequences for position estimation are transmitted, the frequency shift interval, and the frequency offset from the BS.

The UE may receive information about a candidate set of the number of the reference signal sequences for position estimation and a candidate set of the frequency shift interval, or information about the number of the reference signal sequences for position estimation and a candidate set of combinations of the frequency shift intervals.

In addition, the UE may transmit information about the number of reference signal sequences for estimation of a preferred position and a preferred frequency shift interval, to the BS.

Then, the UE may additionally or selectively calculate or acquire the position estimation related information using a reference time point for position estimation and transmit the information to the BS. The position estimation related information may include RSTD and/or TDOA values.

Figure 9:
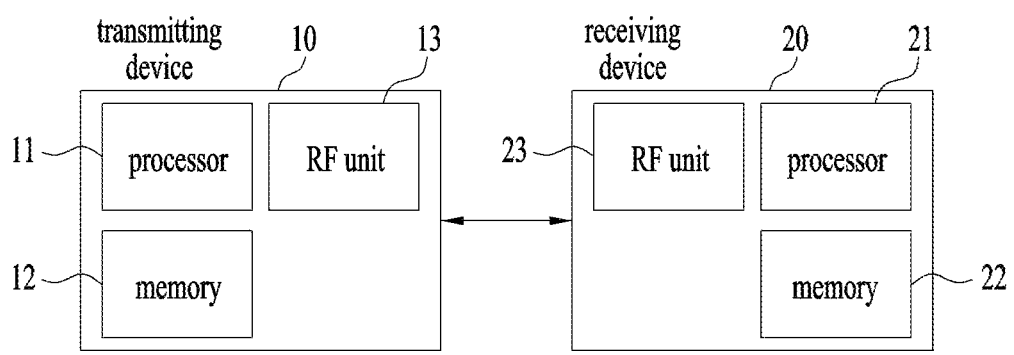
FIG. 9 is a block diagram illustrating an apparatus for embodying embodiment(s) of the present invention.

FIG. 9 is a block diagram of a transmitting device 10 and a receiving device 20 configured to implement exemplary embodiments of the present invention. Referring to FIG. 9, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

According an embodiment of the present invention, accuracy of position estimation can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving a positioning reference signal for positioning in a wireless communication system by a user equipment (UE), the method comprising:
   receiving, from an eNodeB, a plurality of positioning reference signal sequences composed of identical sequences to which different frequency shift values are respectively applied;
   calculating a correlation between the received plurality of positioning reference signal sequences and transmitted positioning reference signal sequences corresponding to the received plurality of positioning reference signal sequences in a time domain; and
   determining a time domain index having a highest value from the calculated correlation as a reference time point for positioning,
   wherein the different frequency shift values are determined according to the sum of multiplication of an index of each positioning reference signal sequence and a frequency shift interval, and a frequency offset.

2. The method according to claim 1, wherein the frequency shift interval is determined in such a way that the calculated correlation has only an effective component.

3. The method according to claim 1, wherein the frequency shift interval is determined as N/M, where N is the number of subcarriers constituting a whole band and M is the number of the positioning reference signal sequences.

4. The method according to claim 1, wherein the frequency shift interval is determined as $\lfloor L(N-N/M)/D \rfloor$, where N is the number of subcarriers constituting a whole band, M is the number of the positioning reference signal sequences, and D corresponds to a specific time period.

5. The method according to claim 1, further comprising receiving information about at least one of the number of the positioning reference signal sequences, an OFDM symbol index of a resource in which the positioning reference signal sequences are transmitted, the frequency shift interval, or the frequency offset.

6. The method according to claim 1, further comprising receiving information about a candidate set of the number of the positioning reference signal sequences and a candidate set of the frequency shift interval, or information about a candidate set of combinations of the number of the positioning reference signal sequences and the frequency shift intervals.

7. The method according to claim 1, further comprising transmitting information about information about preferred number of positioning reference signal sequences and a preferred frequency shift interval.

8. The method according to claim 1, wherein the plurality of positioning reference signal sequences are transmitted in different OFDM symbols.

9. A user equipment (UE) configured to receiver a positioning reference signal in a wireless communication system, the UE comprising:
   a radio frequency (RF) unit; and
   a processor configured to control the RF unit,
   wherein:
   the processor is configured to receive, from an eNodeB, a plurality of positioning reference signal sequences composed of identical sequences to which different frequency shift values are respectively applied, to calculate a correlation between the received plurality of positioning reference signal sequences and transmitted positioning reference signal sequences corresponding to the received plurality of reference signal sequences in a time domain, and to determine a time domain index having a highest value from the calculated correlation as a reference time point for positioning; and
   the different frequency shift values are determined according to the sum of multiplication of an index of each positioning reference signal sequence and a frequency shift interval, and a frequency offset.

10. The UE according to claim 9, wherein the frequency shift interval is determined in such a way that the calculated correlation has only an effective component.

11. The UE according to claim 9, wherein the frequency shift interval is determined as N/M, where N is the number of subcarriers constituting a whole band and M is the number of the positioning reference signal sequences.

12. The UE according to claim 9, wherein the frequency shift interval is determined as $\lfloor L(N-N/M)/D \rfloor$, where N is the number of subcarriers constituting a whole band, M is the number of the positioning reference signal sequences, and D corresponds to a specific time period.

13. The UE according to claim 9, wherein the processor is configured to receive information about at least one of the number of the positioning reference signal sequences, an OFDM symbol index of a resource in which the positioning reference signal sequences are transmitted, the frequency shift interval, or the frequency offset.

14. The UE according to claim 9, wherein the processor is configured to receive information about a candidate set of the number of the positioning reference signal sequences and a candidate set of the frequency shift interval, or information about a candidate set of combinations of the number of the positioning reference signal sequences and the frequency shift intervals.

15. The UE according to claim 9, wherein the processor is configured to transmit information about information about preferred number of positioning reference signal sequences and a preferred frequency shift interval.

16. The UE according to claim 9, wherein the plurality of positioning reference signal sequences are transmitted in different OFDM symbols.

* * * * *